UNITED STATES PATENT OFFICE.

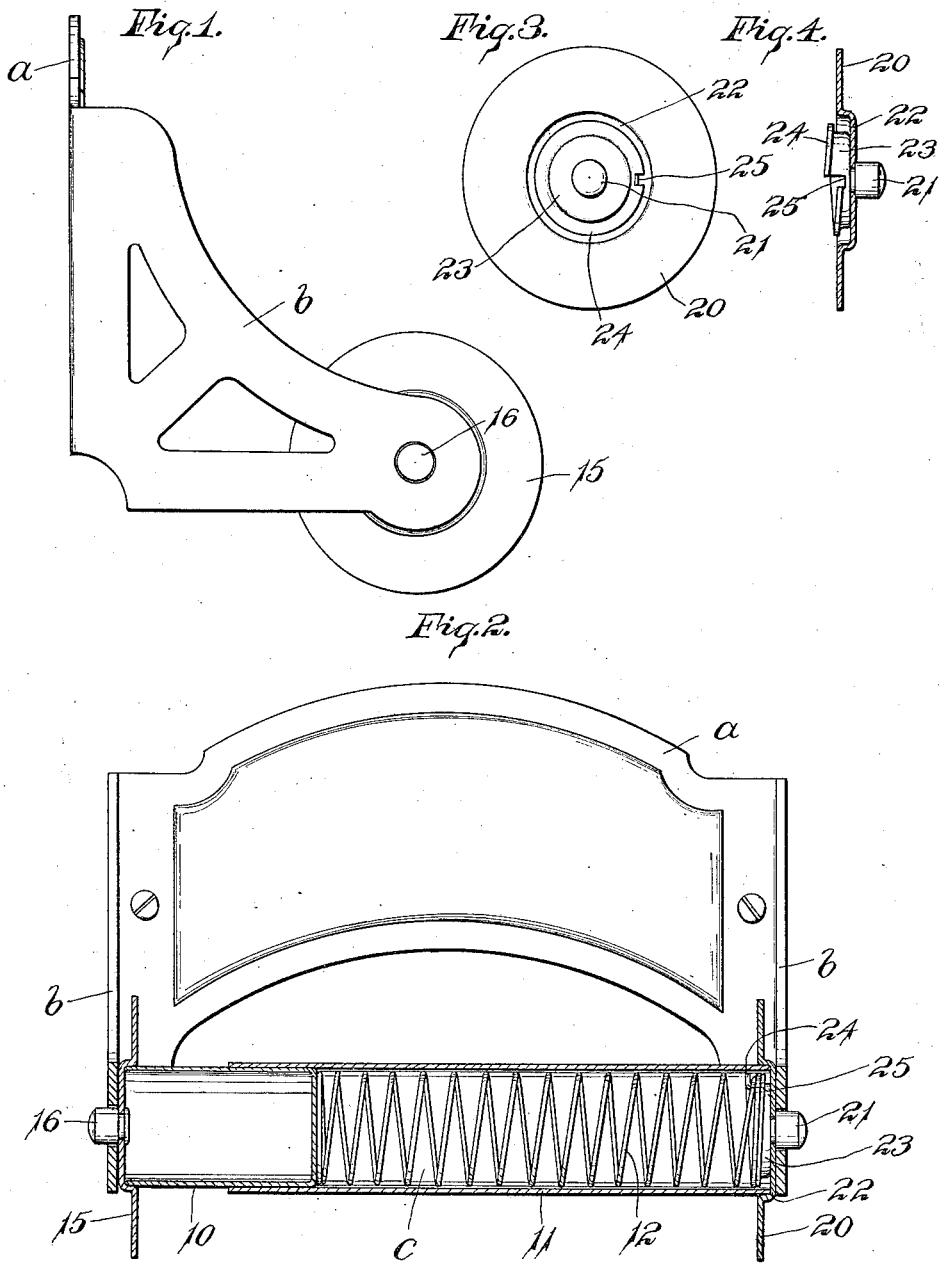

OSCAR MOBERG, OF NEW BRITAIN, CONNECTICUT, ASSIGNOR TO LANDERS, FRARY & CLARK, OF NEW BRITAIN, CONNECTICUT, A CORPORATION OF CONNECTICUT.

ROLL-HOLDER.

1,045,311. Specification of Letters Patent. Patented Nov. 26, 1912.

Application filed November 28, 1911. Serial No. 662,863.

*To all whom it may concern:*

Be it known that I, OSCAR MOBERG, a citizen of the United States, and a resident of New Britain, in the county of Hartford, State of Connecticut, have invented certain new and useful Improvements in Roll-Holders, of which the following is a specification.

The device of this invention is particularly designed for holding toilet paper put up in roll form, the object of the invention being to provide a simple construction of the supporting roll by means of which it can be readily attached to and detached from its supporting bracket, and also to provide a novel method of securing in place the spring which holds the parts of a telescoping roll in position.

In the drawings:—Figure 1 is a side elevation of a device made in accordance with my invention. Fig. 2 is a front view thereof, the roll being shown in central vertical section. Fig. 3 is a view from the inside of one of the roll end flanges showing the method of securing the spring, and Fig. 4 is a side view of the same, the flange being shown in section.

Referring to the drawings $a$ is the bracket, $b$ the bracket arms, and $c$ denotes generally the roll supported in the brackets. The roll is made up of two telescoping parts 10, 11, each having an end flange 15, 20 and bearing pins 16, 21 secured thereto. The female member of the roll 11 carries a spring 12 which normally bears against the male member 10 to hold the bearing pins 16, 21 in engagement with the bracket arms $b$. The roll can be readily disengaged from the bracket arms by pressing the male member 10 into the female member 11 against the spring 12.

A novel and simple method of securing the spring in place in the female member is illustrated in Figs. 2, 3 and 4 where it will be seen that the end flange 20 is centrally recessed as at 22 to receive a cup-shaped retainer 23 which is secured in the recess 22 by riveting over the end of the bearing pin 21. The retainer is provided with a laterally extending flange 24, notched as at 25 and formed in the shape of a spiral as clearly seen in Fig. 4. The spring is of a proper diameter to fit under this flange and is assembled by introducing an end under the high part of the flange through the notch 25 and then turning it to the left which causes the end of the spring to travel down under the low point of the flange, and finally be wedged between the flange and the inner wall of the recess. The diameter of the recess in the end flange is slightly larger than the diameter of the spring and retainer so that the end of the female part of the roll can be fitted down into the recess and either soldered or otherwise secured in place.

I claim as my invention:

1. In a telescoping roll, the combination with a male and female member of a spring located within the female member and bearing against the end of said male member, and means for securing said spring in place, comprising a sheet metal hub the wall of which increases in length gradually to produce a spiral formation of the end of the hub, a laterally extending flange at the end of the hub, and a spring adapted to underlie said flange and be assembled therewith by inserting the end of said spring under the outer end of said flange and rotating it relatively to said hub.

2. A spring holder comprising a recessed plate, a cup-shaped retainer secured in said recess, a lateral flange at the end of said cup-shaped retainer, said flange being notched and the wall of said retainer increasing in depth from one side of said notch to the other side thereof to give said flange a spiral formation, and a spring adapted to underlie said flange and to be assembled therewith by inserting the end of said spring under the high end of said flange and rotating it relatively to said retainer.

OSCAR MOBERG.

Witnesses:
HAROLD GRACE,
H. D. PAYNE.

Copies of this patent may be obtained for five cents each, by addressing the "Commissioner of Patents, Washington, D. C."